United States Patent
Sato (10) Patent No.: US 7,042,496 B2
(45) Date of Patent: May 9, 2006

(54) PHOTO SERVICE SYSTEM AND DIGITAL CAMERA

(75) Inventor: Tsuneo Sato, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 832 days.

(21) Appl. No.: 09/753,576

(22) Filed: Jan. 4, 2001

(65) Prior Publication Data

US 2001/0017652 A1 Aug. 30, 2001

(30) Foreign Application Priority Data

Jan. 14, 2000 (JP) ............................. 2000-005686

(51) Int. Cl.
*H04N 5/225* (2006.01)

(52) U.S. Cl. .............................. 348/207.2; 348/207.99; 348/231.2

(58) Field of Classification Search ........... 348/207.99, 348/157, 158, 159, 207.1, 207.2, 222.1, 231.2, 348/232.1; 386/117; 396/2
See application file for complete search history.

(56) References Cited

U.S. PATENT DOCUMENTS

| | | | | |
|---|---|---|---|---|
| 4,097,893 A | * | 6/1978 | Camras | 348/158 |
| 5,508,737 A | * | 4/1996 | Lang | 348/159 |
| 5,576,758 A | * | 11/1996 | Arai et al. | 348/220.1 |
| 5,625,411 A | * | 4/1997 | Inuiya et al. | 348/220.1 |
| 5,737,491 A | * | 4/1998 | Allen et al. | 348/211.3 |
| 6,016,407 A | * | 1/2000 | Tsukahara | 396/302 |
| 6,046,712 A | * | 4/2000 | Beller et al. | 345/8 |
| 6,166,729 A | * | 12/2000 | Acosta et al. | 345/719 |
| 6,167,469 A | * | 12/2000 | Safai et al. | 710/62 |
| 6,324,521 B1 | * | 11/2001 | Shiota et al. | 705/27 |
| 6,337,712 B1 | * | 1/2002 | Shiota et al. | 348/231.1 |
| 6,452,663 B1 | * | 9/2002 | Robinson et al. | 355/77 |
| 6,493,828 B1 | * | 12/2002 | Yamaguchi et al. | 713/324 |
| 6,522,352 B1 | * | 2/2003 | Strandwitz et al. | 348/211.2 |
| 6,564,070 B1 | * | 5/2003 | Nagamine et al. | 348/14.02 |
| 6,573,927 B1 | * | 6/2003 | Parulski et al. | 348/32 |
| 6,833,861 B1 | * | 12/2004 | Matsumoto et al. | 348/207.2 |

FOREIGN PATENT DOCUMENTS

JP 10-65889 3/1998

* cited by examiner

*Primary Examiner*—David L. Ometz
*Assistant Examiner*—Gevell Selby
(74) *Attorney, Agent, or Firm*—McGinn IP Law Group, PLLC (57) ABSTRACT

A photo service system according to the present invention is structured in an area such as a theme park. The photo service system comprises digital cameras that transmit image data of images captured by the digital cameras, base stations that receive the image data transmitted from the digital cameras, and an image processing part that prints the images according to the image data received by the base stations and sorts the prints of the images according to users of the digital cameras in a photo service center.

42 Claims, 8 Drawing Sheets

PHOTO SERVICE SYSTEM AND DIGITAL CAMERA

BACKGROUND OF THE INVENTION

1. Field of the Invention

The present invention relates generally to a photo service system and a digital camera, and more particularly to a photo service system in which a user transmits data of an image captured by a digital camera to a photo service center by wireless so as to order a print of the image in an area and the digital camera.

2. Description of Related Art

Conventionally, a digital camera stores image data of a captured image in a storage medium, such as a smart medium. When the user wants the print of the image, the user needs to bring the storage medium to a photo shop (FDI service—Fujifilm Digital Imaging service) in order to have the image printed. Japanese patent provisional publication No. 10-65889 discloses a digital camera that transmits image data through a phone without using a storage medium. The user selects or sets where to transmit the image data.

When the user wants the print, the user needs to bring the storage medium to the photo shop or transmit the image data from a personal computer to the photo shop by e-mail. Thus, the print can not be produced soon after the shooting, and it requires complicated operation of the user.

In addition, the structure of the conventional digital camera is complicated since it has a slot for the storage medium, a circuit for storing the image data in the storage medium, a circuit for setting various shooting modes, operation switches and so on. Thus, the digital camera is large and heavy and difficult to operate and is expensive.

SUMMARY OF THE INVENTION

In view of the foregoing, it is an object of the present invention to provide a photo service system in which a user can easily order a print of an image captured by a digital camera and take the print of the image soon after the shooting in an area such as a theme park, and the digital camera that is small and light and easy to operate and inexpensive.

To achieve the above-mentioned object, the present invention is directed to a photo service system structured in an area, said photo service system comprising: a digital camera which transmits image data of images captured by the digital camera and identification information for identifying with the digital camera; a base station which receives the image data and the identification information transmitted from the digital camera; and a photo service center which prints the images according to the image data received by the base station and sorts the prints of the images according to the identification information received with the image data.

According to the present invention, the users transmit the image data and the identification information to the base stations in the area, and the photo service center prints the images and sorts the prints according to the users. Thus, the users can easily order the prints and take the prints soon after the shootings. In addition, the area can differentiate itself from other areas if it has its original prints.

The digital camera used in the photo service system only needs a function for capturing the image, a function for displaying the captured image and a function for transmitting the image. Unlike a digital camera on the market, the proposed digital camera does not need the storage medium, various shooting modes, various operating switches and so forth. Thus, the digital camera is easy to operate and small and light, and its cost is greatly reduced. In case the digital camera is rented to the user in the area, the user does not need to bring his or her own digital camera. In this case, the user never needs to risk damage to his or her own digital camera while carrying it, and the user can take photos even if the user leaves it at home.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
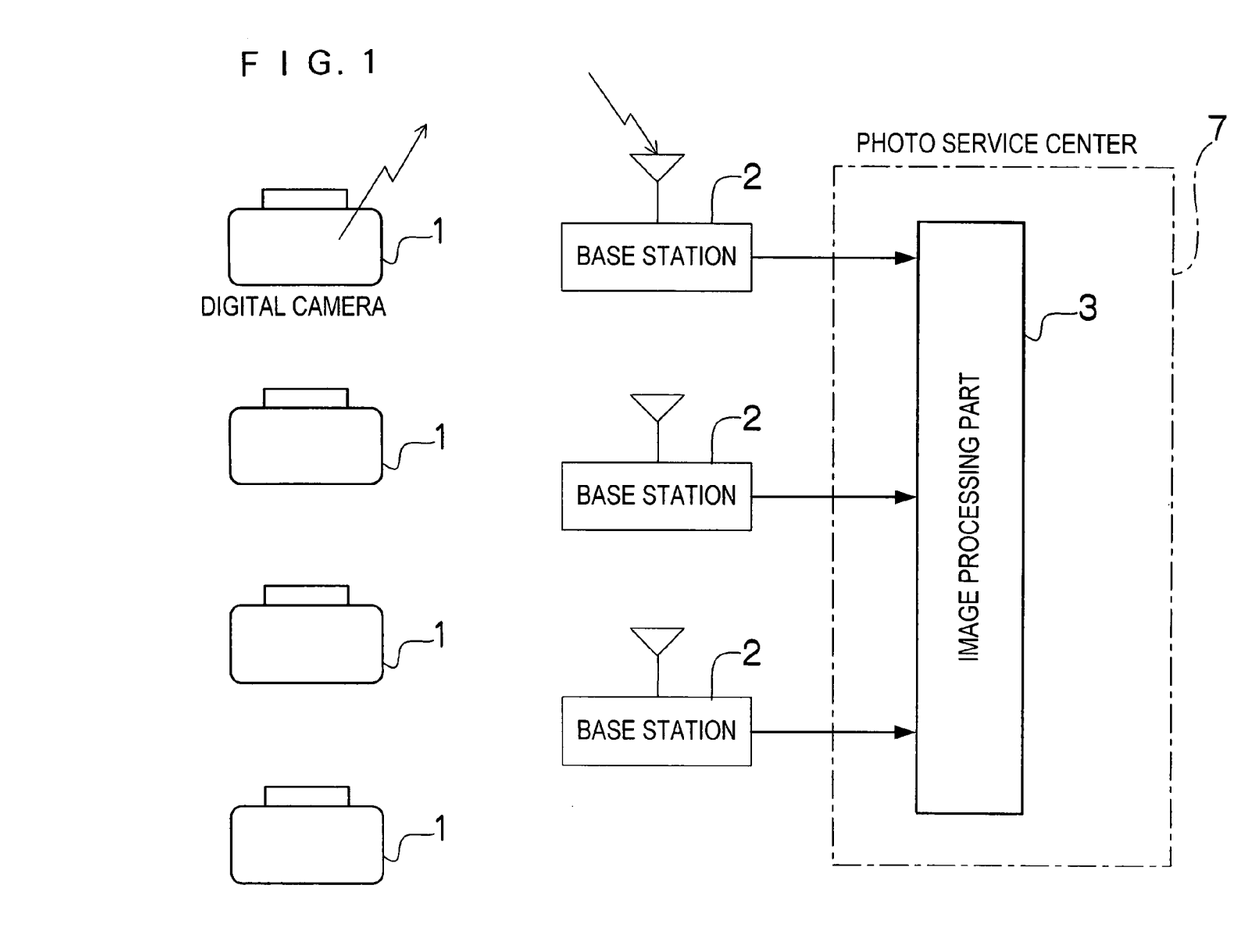
FIG. 1 is a block diagram showing a structure of a photo service system according to the present invention.

FIG. 1 is a block diagram showing the structure of a photo service system according to the present invention. The system is used in an area such as a theme park (for example, Disneyland) and a wedding ceremonial hall, and it is used in the theme park in the embodiment. As shown in FIG. 1, the system comprises digital cameras 1 rented or lent to visitors of the theme park, base stations 2 provided in the theme park, and a photo service center 7 provided in the theme park.

Each digital camera 1 has a communicating function for transmitting image of a captured image to one of the base stations 2 by wireless communication. Each digital camera 1 has an identification code (ID) for identifying the camera or the user, and a built-in memory of the digital camera 1 stores the identification code. The identification code is stored in the memory (ROM—Read Only Memory) that is not rewritable. But, a number may be registered when the digital camera 1 is rented to the user.

The user rents the digital camera 1 at a place (for example, the photo service center 7) in the theme park, and captures an image with the digital camera 1. The user 1 determines whether to transmit the image data. If the user wants a print of the image, the user determines to transmit the image data. The image data is transmitted from the digital camera 1 to one of the base stations 2 by wireless, and then the image data is transmitted from the base station 2 to the photo service center 7. The image is printed in the photo service center 7. The user can order the print of the image by transmitting the image data.

Figure 2:
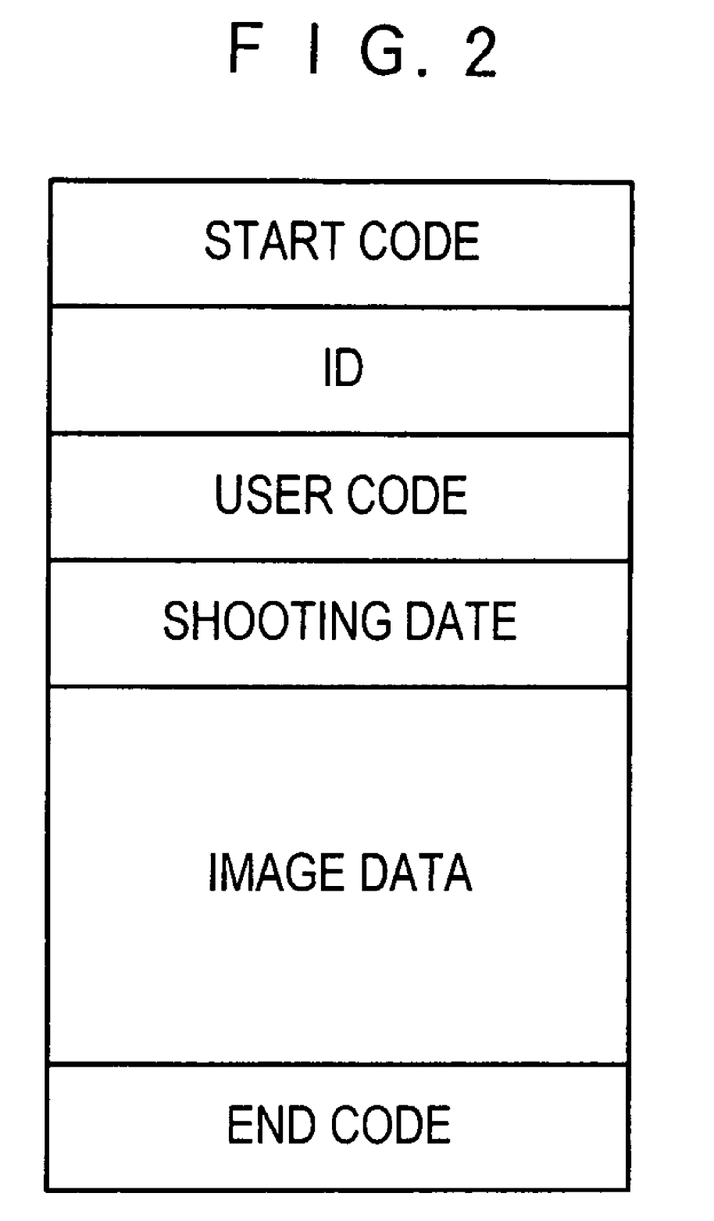
FIG. 2 is a diagram showing a structure of an image file.

The user can determine whether to transmit the image data soon after the image has been captured. If the user determines to transmit the image data, the digital camera 1 generates an image file by attaching data including the identification code to the image data and then transmits the image file. As shown in FIG. 2, the image file is composed of a start code, the identification code (ID), a user code, the shooting date and time, the image data and an end code.

A conventional digital camera stores image data in a detachable storage medium. But, the storage medium is large and expensive. The digital camera 1 of the system transmits the image data to the photo service center 7 by the communicating function soon after the image is captured. Thus, the digital camera 1 does not need the storage medium, and it can be small and light and the cost can be greatly reduced. Also, the user does not have to be concerned about the number of residual frames, and the number of pixels for shooting can always be the maximum.

The base station 2 receives the image file transmitted from the digital camera 1 by wireless. One of the base stations 2 can receive the image data as long as the digital camera 1 is in the theme park. The base stations 2 may receive the image file only when the digital camera 1 is at predetermined places in the theme park.

The wireless communication between the digital camera 1 and the base station 2 is preferably performed with Bluetooth known as a short-distance wireless protocol. But, other protocols such as IrDA (Infrared Data Association) may be used. In addition, wire communication may be performed between the digital camera 1 and the base station 2. For example, a terminal may be provided to receive the image data transmitted from the digital camera 1 through a cable.

In the photo service center 7 built in the theme park, the image is printed according to the image data (the image file) received from the digital camera 1 through the base station 2, and the print is handed to the user. The digital camera 1 is rented and returned in the photo service center 7. In some cases, the digital camera 1 is not necessarily rented and returned in the photo service center 7.

As shown in FIG. 1, the photo service center 7 has an image processing part 3 that controls communications between the digital cameras 1 and the base stations 2 and collects image files received by the base stations 2. The image processing part 3 prints the images according to the collected image files, and sorts the prints according to the users on the basis of identification codes received with the image data. Prints of images captured by one user at different times and places are gathered together and kept until the user comes to take them. The prints may be automatically sorted on the basis of the identification codes, and the identification codes may be printed on the bottom of the prints for making it possible to sort the prints according to the identification codes.

When the user comes to the photo service center 7 to return the digital cameras 1 before leaving the theme park, the identification code of the digital cameras 1 is read and the prints of the images captured by the digital camera 1 are handed to the user.

Figure 3:
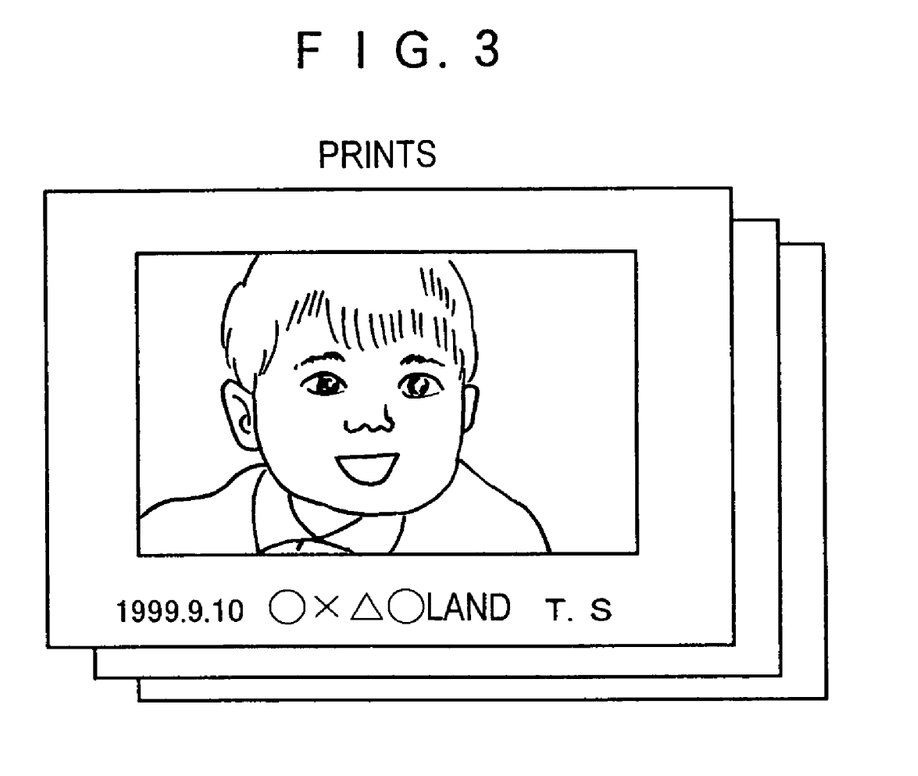
FIG. 3 is a diagram showing prints produced in the photo service system.

FIG. 3 shows the prints produced in the photo service center 7. As shown in FIG. 3, the captured images are printed, and photo information such as the shooting date, the name of the theme park and the name (initials) of the user is printed on the frame of each print. The photo information is transmitted from the digital camera 1 as the user code of the image file in FIG. 2. Which attraction in the theme park each image file was transmitted from may be automatically determined according to the position of the base station 2 that received the image file so that the name of the attraction is printed on the frame of the print.

According to the photo service system, the user can visit the area such as the theme park without a camera and rent the digital camera 1 in the area to capture the image. If the user wants the print of the captured image, the user can order the print by transmitting the image on the spot or near one of the base stations 2. Then, when the user returns to the predetermined place to return the digital camera 1, the user can immediately takes the print.

The user may be charged for the camera rental when renting the digital camera 1, and the user may be charged for the prints according to the number of the prints when taking the prints. Considering a loss caused in case the user does not return the digital camera 1 or does not come to take the prints, the user may be extra charged when renting the digital camera and paid back the extra money when returning the digital camera 1. The user may be charged some money for the prints when renting the digital camera 1 and paid back or charged the difference between the money and the print fee when taking the prints.

Figure 4:
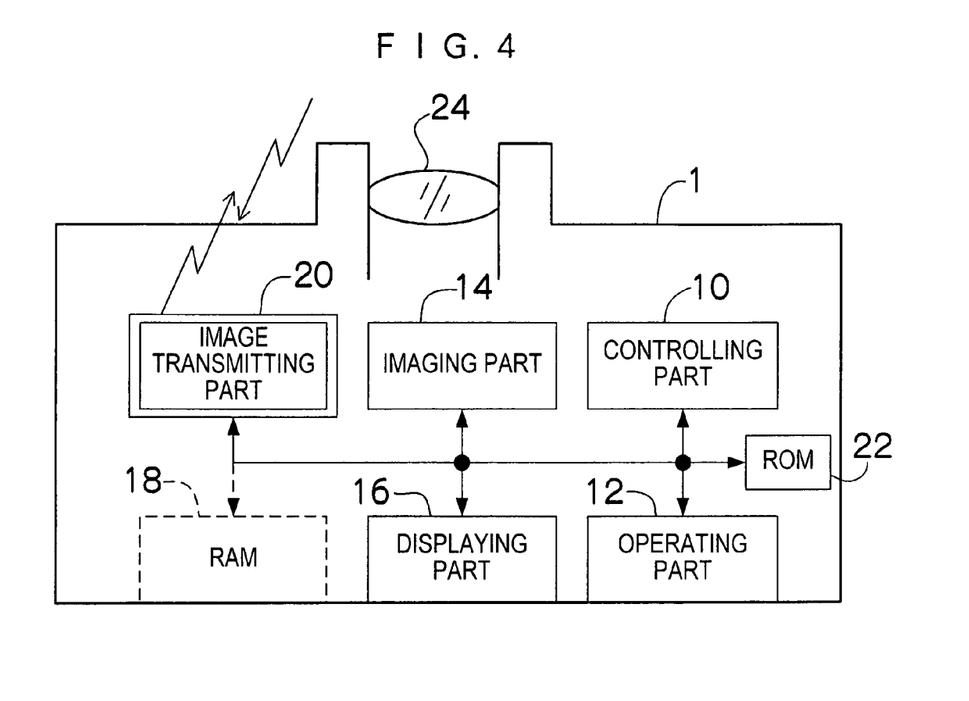
FIG. 4 is a block diagram showing a structure of a digital camera.

FIG. 4 is a block diagram showing the structure of the digital camera 1. As shown in FIG. 4, the digital camera 1 comprises a controlling part 10, an operating part 12, an imaging part 14, a displaying part 16, a RAM (Random Access Memory) 18, an image transmitting part 20 and a ROM 22. The digital camera 1 does not have the storage medium a general digital camera has or a large-capacity storage device to make it small and light and make its cost greatly reduced.

The controlling part 10 controls the other parts according to the operation of buttons of the operating part 12 that will be described later.

The imaging part 14 has a CCD (Charge Coupled Device) and a signal processing circuit, and converts an image formed on a light-receiving surface of the CCD through a taking lens 24 into electric signals, and generates digital image data by processing the electric signals with the signal processing circuit. When a shutter release button is being half pressed, the imaging part 14 sequentially captures images to transmit the image data to the displaying part 16, and an LCD (Liquid Crystal Display) of the displaying part 16 displays the moving image. When the shutter release button is fully pressed, the imaging part 14 captures an image of one frame and stores the image data in the RAM 18. If the user wants the print of the captured image, the user transmits the image data to one of the base stations 2 before capturing another image. The image data stored in the RAM 18 is erased each time the imaging part 14 captures an image. Thus, the capacity of the RAM 18 only needs to be enough for the image data of one frame.

The displaying part 16 controls the LCD provided on the back of the digital camera 1 to display the images and the like on the LCD.

When an image transmission button of the operating part 12 is pressed, the image transmitting part 20 transmits the image file composed of the image data stored in the RAM 18 and the data such as the identification code to the base station 2 by wireless.

The image file is shown in FIG. 2, and the identification code (ID) is previously stored in the ROM 22. The photo information (the name of the theme park, the name of the user and so on printed on the frame of the print) transmitted as the user code of the image file is dealt with according to the print service given in the photo service system. In case only the predetermined photo information (such as the name of the theme park) is to be printed on the print whoever uses the digital camera 1, the photo information is previously stored in the ROM 22 and transmitted as the user code. The photo information may be automatically printed in the photo service center 7 without being transmitted.

In case the photo information that is specific to the user such as the name of the user is to be printed on the frame of the print with the predetermined photo information, a setting device sets the specific information in a memory built in the digital camera 1. For example, the digital camera 1 can communicate with an external apparatus such as a personal computer through a cable such as a USB (Universal Serial Bus) cable, and the specific information can be set in the memory of the digital camera 1 from the external apparatus when the digital camera 1 is rented to the user. Keys for inputting the specific information may be provided on the digital camera 1. The predetermined photo information is previously stored in the ROM 22 or automatically printed in the photo service center 7. The predetermined photo information may be set from the external apparatus with the specific information so that the photo information is transmitted as the user code. The specific information may be previously set with respect to the identification code in the photo service center 7 instead of being transmitted as the user code. In this case, when the photo service center 7 receives the image file with the identification code, the set photo information is printed with the image. The user may set the whole photo information.

Figure 5:
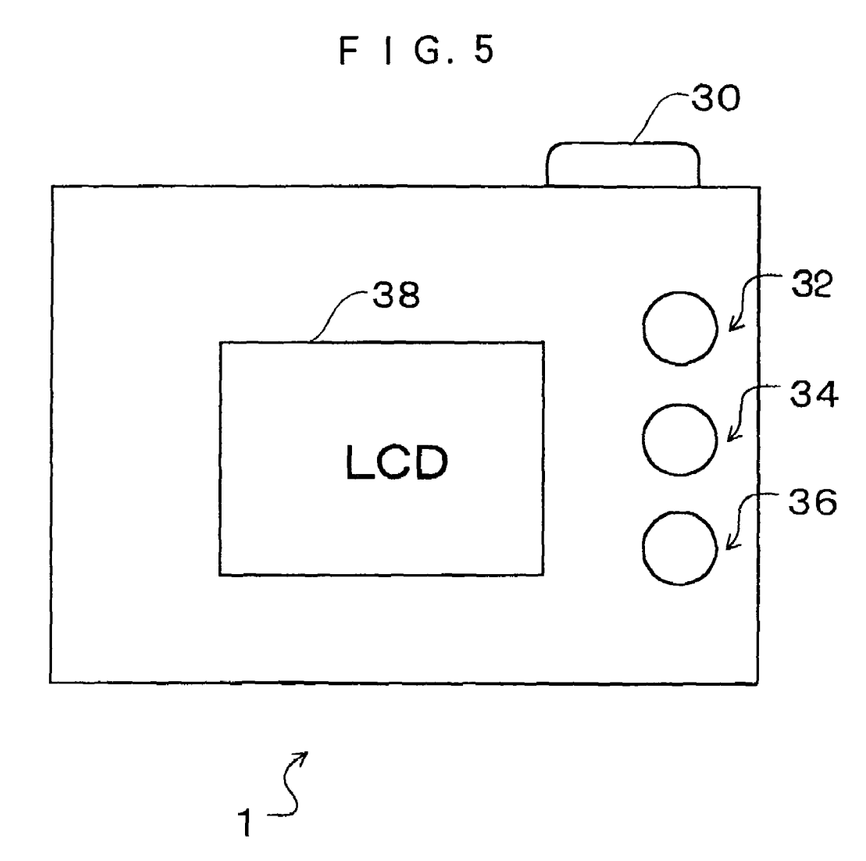
FIG. 5 is a back view of the digital camera.

The buttons of the operating part 12 will now be explained. FIG. 5 is a back view of the digital camera 1. As shown in FIG. 5, the shutter release button 30 is provided on the top of the digital camera 1, and the image transmission button 32, a cancel/power button 34 and an electronic flash set button 36 are provided on the back of the digital camera 1. These buttons 30–36 compose the operating part 12. Also, the LCD 38 controlled by the displaying part 16 is provided on the back of the digital camera 1. Since the digital camera 1 has only four buttons, it is easy to operate and small and light and its cost is greatly reduced.

If the user presses the cancel/power button 34 when the power is off, the power is turned on. After that, if the user half presses the shutter release button 30, the controlling part 10 makes the imaging part 14 start capturing the image and makes the displaying part 16 start displaying the image on the LCD 38. This automatically starts displaying the moving image on the LCD 38, and the user determines the view angle while looking at the moving image.

Then, if the user fully presses the shutter release button 30, the controlling part 10 makes the imaging part 14 capture the image of the one frame and stores the image data on the RAM 18. The controlling part 10 makes the displaying part 16 display the image on the LCD 38, and the user looks at the captured image on the LCD 38.

If the user releases the shutter release button 30 instead of fully pressing it after half pressing it, the controlling part 10 makes the displaying part 16 stop displaying the moving image on the LCD 38 three seconds later to save electricity.

The user looks at the image displayed on the LCD 38. If the user wants the print of the image, the user presses the image transmission button 32 while the image is displayed on the LCD 38. Then, the controlling part 10 produces the image file in FIG. 2 from the image data stored in the RAM 18 and the identification code and so on stored in the ROM 22, and transmits the image file from the image transmitting part 20 to the base station 2 by wireless.

If the user does not want the print of the image, the user presses the cancel/power button 34. This automatically cancels the transmission of the image data and turns off the power. If the user does not press either of the image transmission button 32 and the cancel/power button 34 for one minute after fully pressing the shutter release button 30, the controlling part 10 automatically cancels the transmission of the image data and turns off the power to save electricity.

Each time the electronic flash set button 36 is pressed, an electronic flash is switched between three modes in which the electronic flash emits light, the electronic flash does not emit the light and the electronic flash determines whether to emit the light by automatically measuring the brightness. The controlling part 10 controls an electronic flash circuit (not shown in FIG. 4) according to the number of times the electronic flash set button 36 was pressed.

Figure 6:
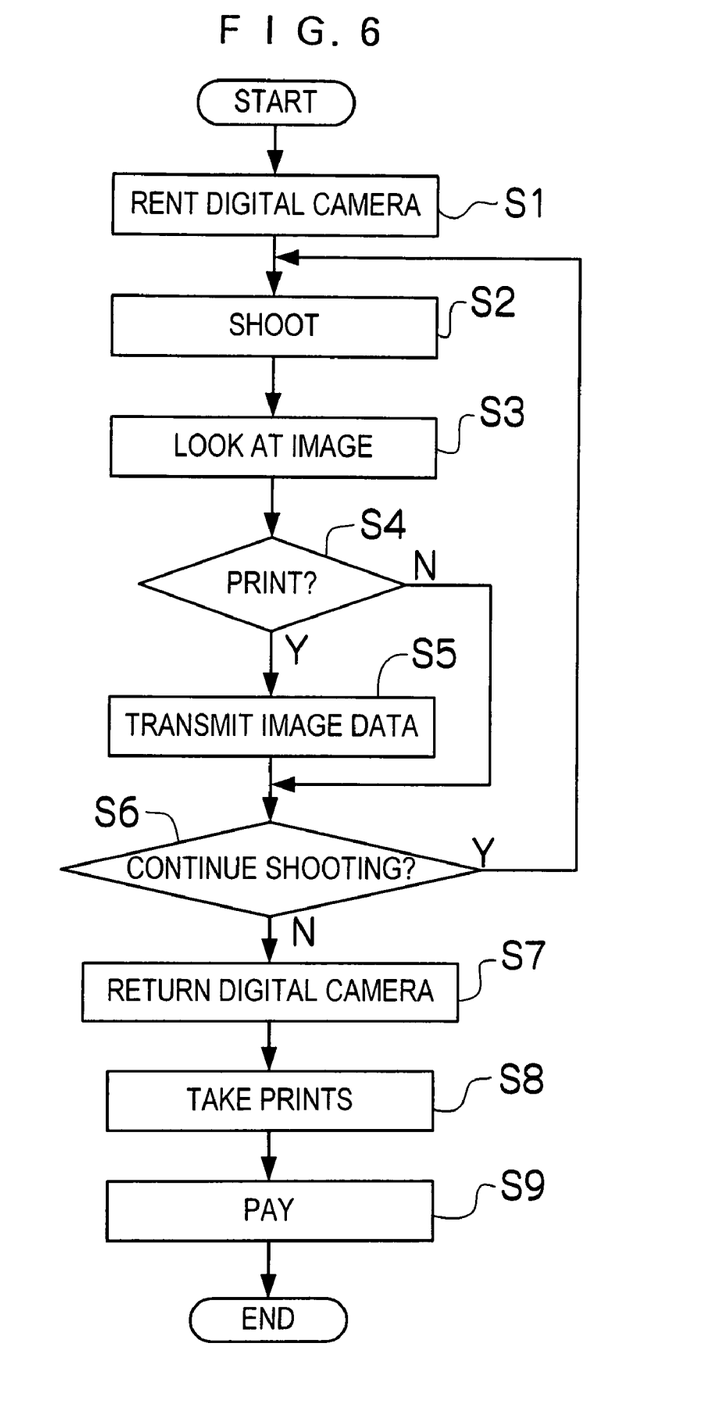
FIG. 6 is a flow chart showing an operation of the digital camera by a user in the photo service system.

The operation of the digital camera 1 by the user in the photo service system will now be explained with reference to the flow chart in FIG. 6. First, the user rents the digital camera 1 in the photo service center 7 or some other place in the theme park at the time of being admitted (step 1). Then, the user captures the image with the digital camera 1 by fully pressing the shutter release button 30 in the theme park (step 2). The LCD 38 displays the captured image, and the user looks at the image (step 3) and determines whether to order the print of the image (step 4). If yes, the user presses the image transmission button 32 to transmit the image data to the image processing part 3 of the photo service center 7 through the base station 2 (step 5). If no, the user presses the cancel/power button 34 or does not press either of the image transmission button 32 and the cancel/power button 34 for one minute not to transmit the image data.

Then, the user determines whether to shoot again (step 6). If the user wants to shoot again, he or she returns to step 2. If the user wants to end the shooting, the user returns the digital camera 1 in the photo service center 7 or somewhere else (step 7). The user takes the prints produced in the photo service center 7 (step 8) and pays for the prints according to the number of the prints (step 9).

Figure 7:
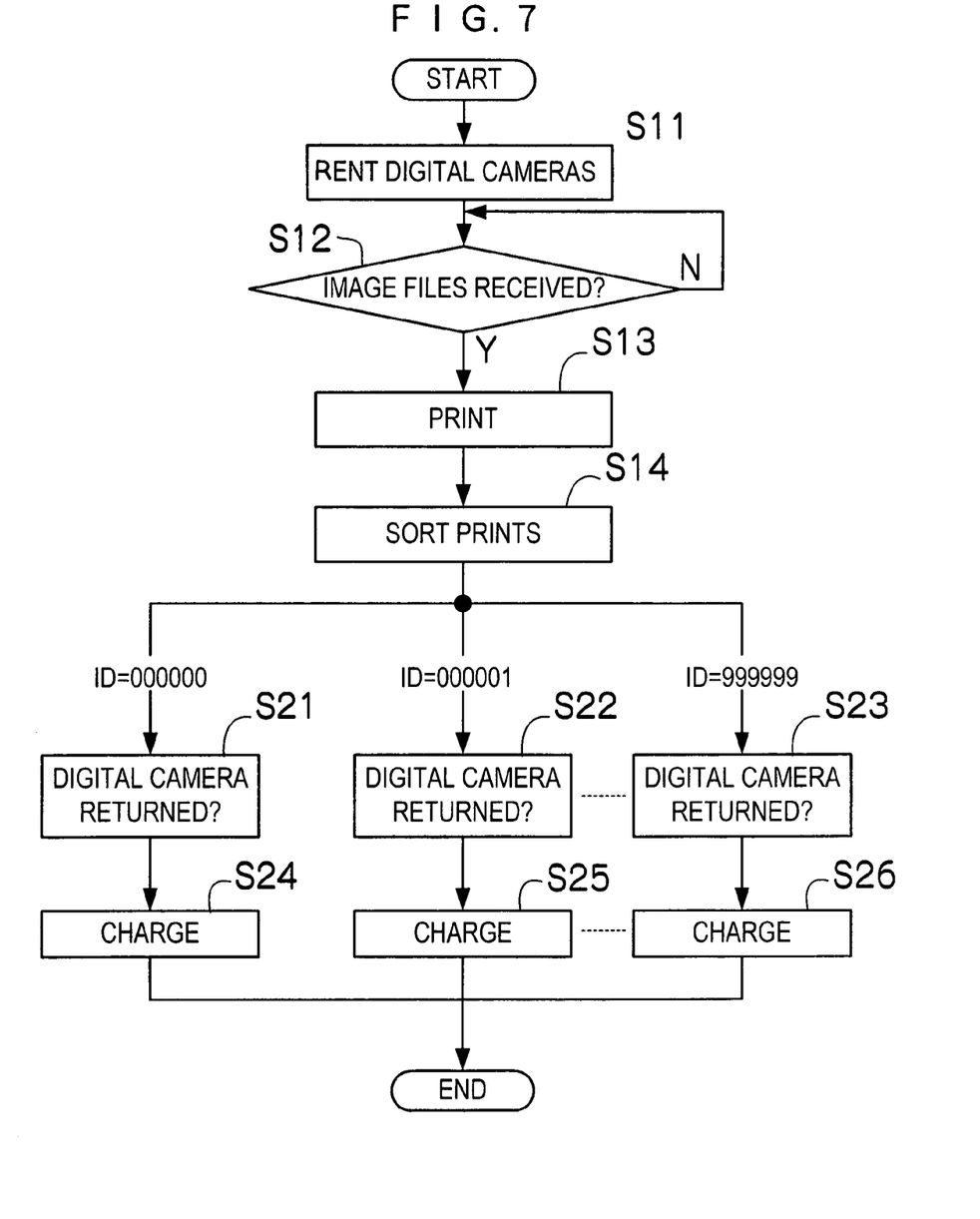
FIG. 7 is a flow chart showing a processing of a service provider.

The processing of a service provider who provides the photo print service to the users will now be explained with reference to the flow chart of FIG. 7. First, the service provider rents the digital cameras 1 to the users (step 11). Then, the image processing part 3 of the photo service center 7 determines whether or not it has received the image files through the base stations 2 (step 12). If the image processing part 3 has received the image files, the service provider prints the images according to the image data of the image files (step 13) and sorts the prints according to the identification codes (ID) of the image files (step 14). For example, the identification codes are 000000 through 999999. When the digital cameras 1 are returned (steps 21, 22 and 23), the service provider charges the users according to the numbers of the prints with the identification codes (steps 24, 25 and 26).

Figure 8:
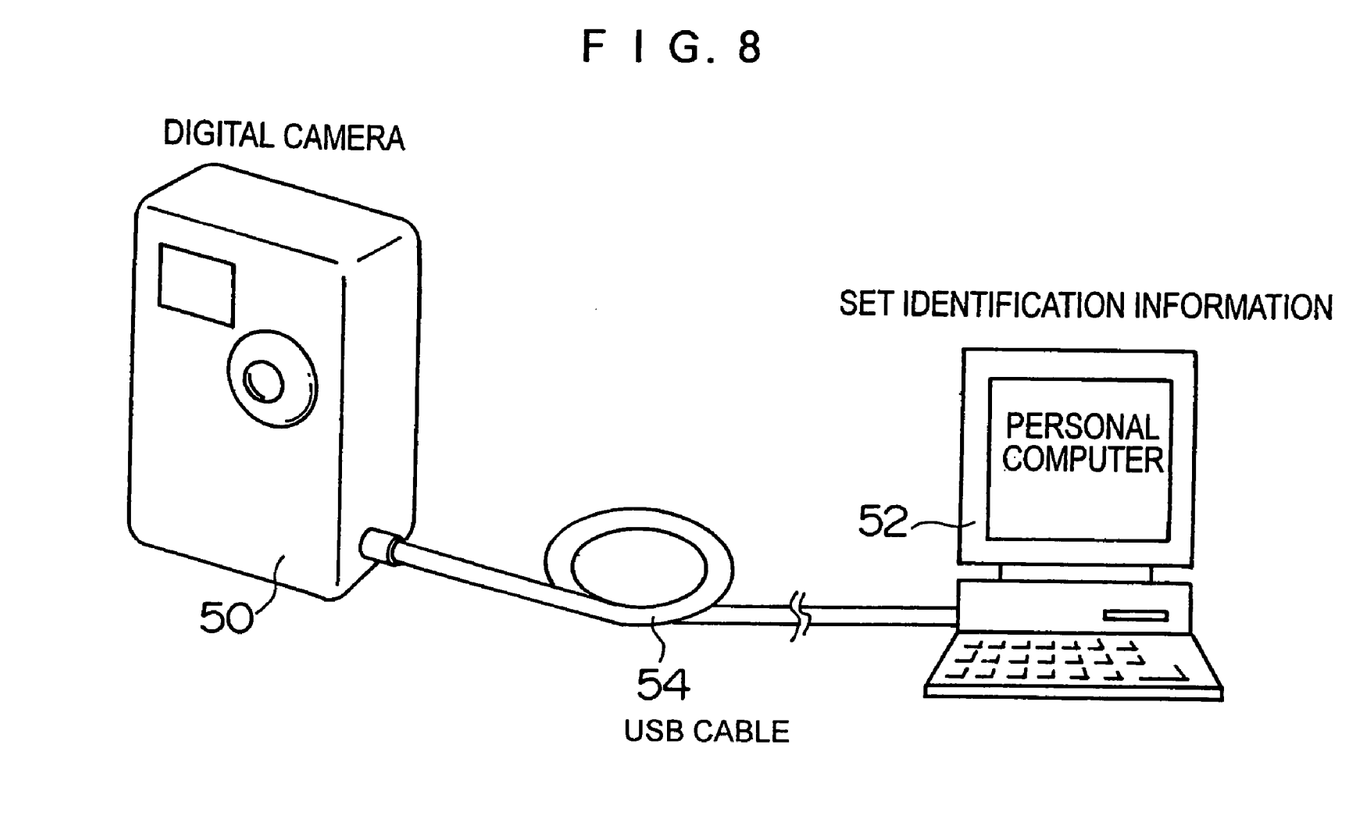
FIG. 8 is a diagram showing a method for setting an identification code in the digital camera.

The user rents the digital camera 1 when being admitted to the area such as the theme park in the embodiment, but the user may use his or her own digital camera in case it has a function for communicating with the base stations 2. In this case, an identification code designated by the service provider is registered in the digital camera, or an identification code registered in the digital camera is registered with the service provider, and the identification code is transmitted from the digital camera with the image data. For example, as shown in FIG. 8, the digital camera 50 is connected to the personal computer 52 through the cable 54 such as the USB cable so that the identification code is set in the digital camera 50 from the personal computer 52. The user code (photo information) may be set from the personal computer 52 in the same way.

The user transmits the image data soon after capturing the image of the one frame to the photo service center 7 to order the print in the embodiment, but the digital camera 1 may have a storage device that stores image data of some frames to make it possible for the user to transmit the image data of the frames to the photo service center 7 so as to order the prints of the images at one time.

As set forth hereinabove, in the photo service system according to the present invention, the users transmit the image data and the identification information to the base stations in the area, and the photo service center prints the images and sorts the prints according to the users. Thus, the users can easily order the prints and take the prints soon after the shootings. In addition, the area can differentiate itself from other areas if it has its original prints.

The digital camera used in the photo service system only needs the function for capturing the image, the function for displaying the captured image and the function for transmitting the image. Unlike a digital camera on the market, the digital camera does not need the storage medium, various shooting modes, various operating switches and so on. Thus, the digital camera is easy to operate and small and light, and its cost is greatly reduced. In case the digital camera is rented to the user in the area, the user does not need to bring his or her own digital camera. In this case, the user never damages his or her own digital camera while carrying it, and the user can take photos even if the user leaves it at home.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A photo service system structured in an area, said photo service system comprising:
   a digital camera which transmits image data of images captured by the digital camera and identification information for identifying with the digital camera;
   a base station which receives the image data and the identification information transmitted from the digital camera; and
   a photo service center which prints the images according to the image data received by the base station and sorts the prints of the images according to the identification information received with the image data,
   wherein the photo service center identifies the prints of the images based on a location corresponding to the base station that transmitted the image file.

2. The photo service system as defined in claim 1, wherein the digital camera transmits the image data and the identification information to the base station by wireless communication.

3. The photo service system as defined in claim 1, wherein the photo service center prints information comprising at least one of the shooting date, the shooting places and the names of users on frames of the prints of the images.

4. A digital camera exclusively used in the photo service system as defined in claim 1.

5. The digital camera as defined in claim 4, wherein the digital camera is rented to a user in the area.

6. The digital camera as defined in claim 4, comprising:
   a shutter release button; and
   a displaying device which automatically turns on to start displaying a moving image when the user half-presses the shutter release button.

7. The digital camera as defined in claim 6, wherein the displaying device automatically turns off when the user releases the shutter release button after half-pressing the shutter release button.

8. A digital camera used in the photo service system as defined in claim 1, comprising:
   a setting device which sets identification information for identifying the digital camera.

9. The photo service system as defined in claim 1, wherein said base station comprises a plurality of base stations that selectively receive image data and identification information transmitted from the digital camera based on a location of said camera at a time of transmission of the image data of each image.

10. The photo service system as defined in claim 9, wherein the location of said camera at the time of transmission is automatically printed on the prints of the images.

11. The photo service system as defined in claim 1, wherein said photo service center automatically prints each image upon receipt of the image data of each captured image by the base station.

12. A photo service system comprising:
   at least one digital camera which selectively transmits image data of images captured by the at least one digital camera, and identification information for identifying the at least one digital camera;
   at least one base station which receives the image data and the identification information transmitted from the at least one digital camera; and
   a photo service center which automatically prints the images according to the image data received by the at least one base station and sorts the prints of the images according to the identification information received with the image data,
   wherein the photo service center identifies the prints of the images based on a location corresponding to the respective at least one base station that transmitted the image file.

13. A photo service system as defined in claim 12, wherein the photo service center identifies the prints of the images by printing a name or symbol that corresponds to the location on a frame of the prints of the images.

14. The photo service system as defined in claim 12, wherein the at least one digital camera transmits the image data and the identification information to the base station by wireless communication.

15. The photo service system as defined in claim 12, wherein the photo service center prints information comprising at least one of a shooting date, a shooting place, and a name of a user on frames of the prints of the images.

16. The photo service system as defined in claim 12, wherein the at least one digital camera comprises:
   a shutter release button; and
   a displaying device which automatically turns on and displays a moving image when the shutter release button is pressed to a first position.

17. The photo service system as defined in claim 16, wherein the displaying device automatically turns off when the shutter release button is released after being pressed to the first position.

18. The photo service system as defined in claim 16, wherein the displaying device displays an image corresponding to the image data captured by the at least one digital camera when the shutter button is pressed to a second position.

19. The photo service system as defined in claim 16, wherein the photo service center comprises an image processing part for controlling communications between the at least one digital camera and the at least one base station.

20. The photo service system as defined in claim 19, wherein the image processing part collects image files received by the at least one base station.

21. The photo service system as defined in claim 20, wherein the image processing part prints the images according to the collected image files and sorts the prints based on the identification information received with the image file.

22. The photo service system as defined in claim 19, wherein the image processing part:
   gathers images received by the at least one base station and captured by one of the at least one digital camera at a plurality of times and locations;
   prints the images; and
   sorts the printed images on the basis of the identification information.

23. The photo service system as defined in claim 19, wherein the image processing part:
   collects image files including images captured by one of the at least one digital camera at a plurality of times and locations;
   prints the images according to the collected image files; and
   sorts the printed images on the basis of the identification information.

24. The photo service system as defined in claim 16, wherein the at least one digital camera further comprises:
   a power button for turning on the digital camera; and
   a controlling part for canceling the transmission of the image data and turning off the digital camera if the image transmission button or the cancel/power button are not pressed within a predetermined period of time from a pressing of the shutter release button.

25. The photo service system as defined in claim 12, further comprising a setting device for setting identification information for identifying the at least one digital camera.

26. The photo service system as defined in claim 12, wherein the image data is erased when the at least one digital camera captures a new image.

27. The photo service system as defined in claim 12, wherein the at least one digital camera comprises a memory having a predetermined capacity capable of storing image data for a single image only.

28. The photo service system as defined in claim 27, wherein the image data stored in the memory of the at least one digital camera is erased when the at least one digital camera captures a new image.

29. The photo service system as defined in claim 12, wherein the at least one digital camera comprises an image transmission button for selectively transmitting the image data of the images.

30. The photo service system as defined in claim 12, wherein the at least one digital camera comprises a cancel/power button for canceling the transmission of the image data and turning off the power.

31. The photo service system as defined in claim 12, wherein the at least one digital camera comprises a power button for turning on the digital camera.

32. The photo service system as defined in claim 12, wherein the at least one digital camera comprises an electronic flash set button.

33. The photo service system as defined in claim 12, wherein the at least one digital camera comprises a memory including a predetermined memory capacity capable of storing image data; and
   wherein said at least one digital camera stores image data for no more than a single image at a time.

34. A photo service system comprising:
   at least one digital camera which selectively transmits image data of images captured by the at least one digital camera, and identification information for identifying the at least one digital camera;
   at least one base station which receives the image data and the identification information transmitted from the at least one digital camera; and
   a photo service center which automatically prints the images according to the image data received by the at least one base station and sorts the prints of the images according to the identification information received with the image data, wherein the at least one base station selectively receives the image data and the identification information based on a proximity of the at least one digital camera to the at least one base station.

35. A photo service method comprising:
capturing and viewing images with a digital camera;
selectively transmitting image data of the captured images and identification information for identifying the digital camera;
receiving the transmitted image data and identification information at an at least one base station;
printing the image according to the image data received by the at least one base station;
sorting prints of the images according to the identification information received with the image data; and
identifying each of the prints of the images based on a location corresponding to each of the at least one base station that transmitted the image file.

36. The photo service method as defined in claim 35, wherein the image data and the identification information are transmitted to the at least one base station by wireless communication.

37. The photo service method as defined in claim 35, further comprising setting identification information for identifying the at least one digital camera.

38. The photo service method as defined in claim 35, further comprising erasing the image data from the at least one digital camera when the image data is transmitted to the at least one base station.

39. The photo service method as defined in claim 35, wherein said selectively transmitting comprises selecting an image transmission function for transmitting the image data to the at least one base station, thereby ordering prints of the captured images.

40. The photo service method as defined in claim 35, further comprising calculating a monetary charge based on a number of prints printed.

41. The photo service method as defined in claim 35, wherein said printing comprises automatically printing the image upon receipt of the image data by the at least one base station.

42. A photo service system structured in an area, said photo service system comprising:
- a digital camera which transmits image data of each image captured by the digital camera and identification information for identifying with the digital camera;
- a plurality of base stations that selectively receive image data and identification information transmitted from the digital camera based on a location of said camera at a time of transmission of each image;
- a photo service center that automatically prints each image upon receipt of the image data of each captured image by the base station and sorts the prints of the images according to the identification information received with the image data, and
- identifying each of the prints of the images based on a location corresponding to at least one base station of the plurality of base stations that transmitted the image file,
- wherein the photo service center identifies the prints of the images based on a location corresponding to the respective at least one base station of the plurality of base stations that transmitted the image file.

* * * * *